United States Patent
Saito et al.

(10) Patent No.: US 7,574,919 B2
(45) Date of Patent: Aug. 18, 2009

(54) INTEGRATED SENSOR INCLUDING A PRESSURE SENSOR AND A TEMPERATURE SENSOR

(75) Inventors: Kazunori Saito, Matsumoto (JP);
Kimihiro Ashino, Matsumoto (JP);
Katsumichi Ueyanagi, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 0 days.

(21) Appl. No.: 11/937,950

(22) Filed: Nov. 9, 2007

(65) Prior Publication Data
US 2008/0110268 A1 May 15, 2008

(30) Foreign Application Priority Data
Nov. 10, 2006 (JP) .............................. 2006-305260

(51) Int. Cl.
*G01L 19/04* (2006.01)
(52) U.S. Cl. .......................................... 73/708; 73/756
(58) Field of Classification Search .............. 73/204.22, 73/204.23, 708, 756; 374/E1.018
See application file for complete search history.

(56) References Cited

U.S. PATENT DOCUMENTS

| | | | |
|---|---|---|---|
| 4,420,738 A | 12/1983 | Rehmann et al. | |
| 4,843,882 A | 7/1989 | Ohta et al. | |
| 5,693,879 A * | 12/1997 | Rilling et al. | 73/114.34 |
| 6,003,379 A | 12/1999 | Ichikawa et al. | |
| 6,253,606 B1 * | 7/2001 | Yonezawa et al. | 73/204.26 |
| 6,272,913 B1 | 8/2001 | Naegele et al. | |
| 6,308,574 B1 | 10/2001 | Klun et al. | |
| 6,604,430 B2 * | 8/2003 | Saito et al. | 73/756 |
| 6,820,479 B2 * | 11/2004 | Roeckel et al. | 73/202.5 |
| 6,896,002 B2 | 5/2005 | Hart et al. | |
| 6,962,081 B2 | 11/2005 | Ueyanagi et al. | |

(Continued)

FOREIGN PATENT DOCUMENTS

DE 198 16 872 A1 10/1999

(Continued)

OTHER PUBLICATIONS

Extended search report, dated Sep. 2, 2008, issued in corresponding EP application No. 07021766.6-1236.

(Continued)

*Primary Examiner*—Lisa M Caputo
*Assistant Examiner*—Freddie Kirkland, III
(74) *Attorney, Agent, or Firm*—Rossi, Kimms & McDowell, LLP

(57) ABSTRACT

An integrated sensor includes a pressure sensor integrated with a temperature sensor. When the sensor is attached to an object of attachment at a mounting position at an angle of $\theta_{rq}$ degrees with respect to an ideal attachment position, in which a central axis of at sensor body element of the temperature sensor element is disposed perpendicular to a direction in which a gas to be measured passes through the object of attachment, an inclination angle $\theta_{pos}$ at which the central axis of the sensor body element is inclined at the mounting position with respect to a position of the central axis of the main body element at the ideal attachment position is set according to the following equation:

$$(\theta_{rq} - \theta_{allow}) \leq \theta_{pos} \leq (\theta_{rq} + \theta_{allow})$$

wherein $\theta_{allow}$ represents an allowable angle at which an allowable response speed of the temperature sensor element is obtained.

5 Claims, 10 Drawing Sheets

U.S. PATENT DOCUMENTS

| | | |
|---|---|---|
| 6,971,269 B2 | 12/2005 | Nomura |
| 7,104,136 B2 | 9/2006 | Akiyama et al. |
| 7,216,546 B2 | 5/2007 | Hayashi et al. |
| 7,260,992 B2 | 8/2007 | Hayashi et al. |
| 7,412,894 B2 * | 8/2008 | Ueyanagi et al. ............... 73/753 |
| 2002/0144554 A1 | 10/2002 | Ueyanagi et al. |
| 2003/0037610 A1 | 2/2003 | Roeckel et al. |
| 2005/0268723 A1 | 12/2005 | Akiyama et al. |
| 2008/0110273 A1 * | 5/2008 | Saito et al. ................... 73/756 |

FOREIGN PATENT DOCUMENTS

| | | |
|---|---|---|
| GB | 2179161 A | 2/1987 |
| JP | 2002-310836 A | 10/2002 |
| JP | 2005-345412 A | 12/2005 |

OTHER PUBLICATIONS

Related co-pending application U.S. Appl. No. 11/939,077, filed on Nov. 13, 2007 including the Specification, pp. 1-14; Claims 1-13 on pp. 15-17; Abstract, p. 18; and Drawings, Figs 1-7.

Extended European Search Report dated Feb. 5, 2009, issued in European Application No. 07021765.8 - 1236/1921433, which corresponds with related USSN11/939,077.

* cited by examiner

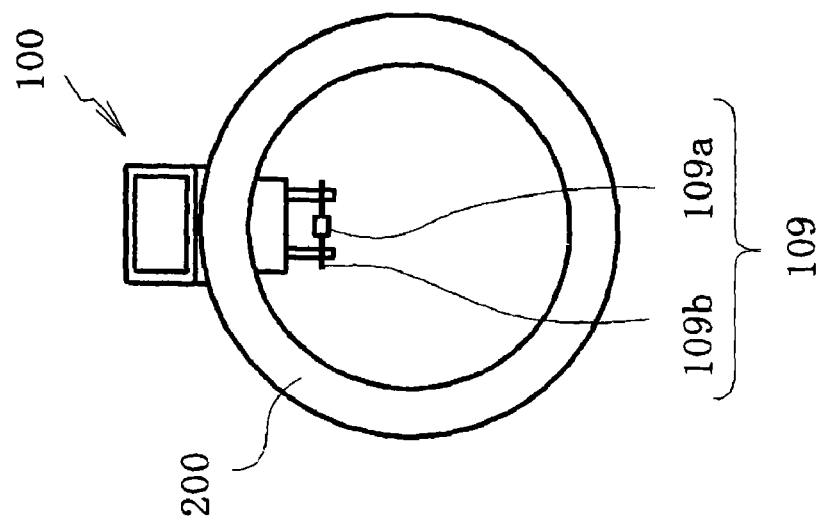
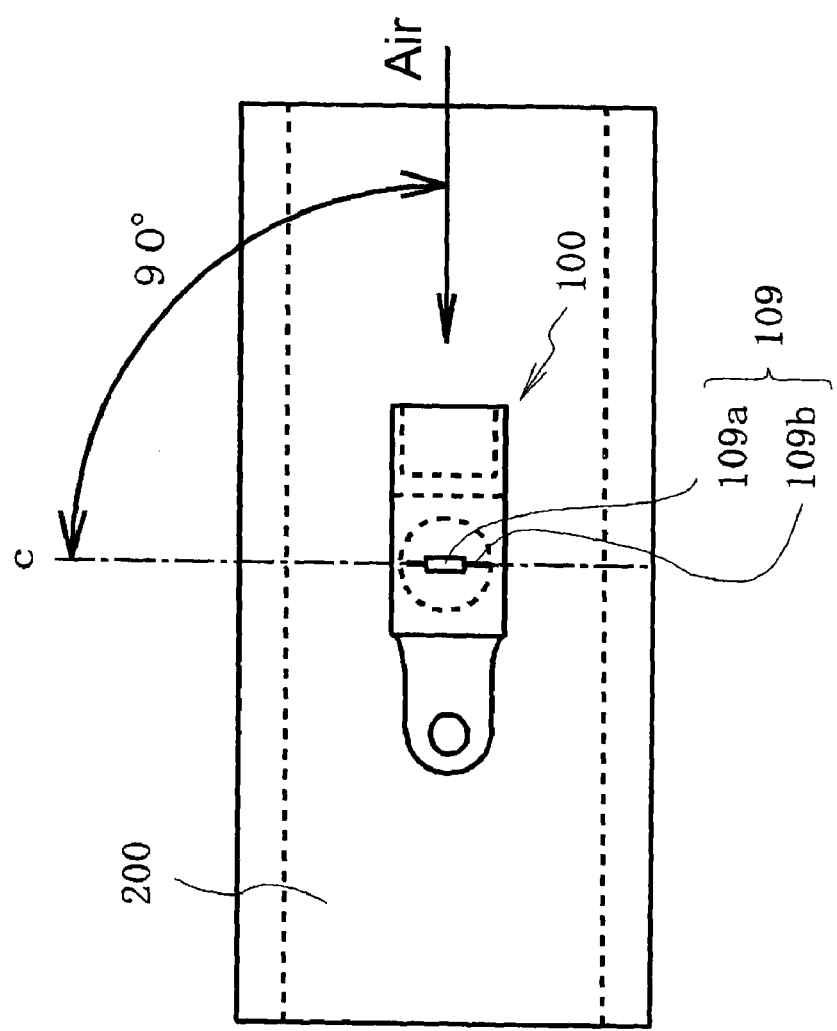
FIG. 7A
FIG. 7B

INTEGRATED SENSOR INCLUDING A PRESSURE SENSOR AND A TEMPERATURE SENSOR

CROSS-REFERENCE TO RELATED APPLICATION

This application claims priority from Japanese Patent Application No. 2006-305260 filed on Nov. 10, 2006, the contents of which are incorporated herein by reference.

BACKGROUND OF THE INVENTION

The present invention relates in general to a temperature sensor for sensing the temperature of a gas. More specifically, the invention relates to an integrated sensor that includes a temperature sensor, which has incorporated therein a temperature sensor element for measuring the temperature of a gas, and a pressure sensor element.

FIGS. 6 and 7 illustrate an example of an integrated sensor that includes a pressure sensor integrated with a temperature sensor, which is set up in an intake manifold of a vehicle and measures the temperature and pressure of an intake air/fuel mixture within the intake manifold. FIG. 6 is a vertical cross-sectional view of a central part of an integrated sensor 100. FIG. 7A is a plan view showing the integrated sensor 100 of FIG. 6 installed in a position to measure the pressure within an intake manifold 200 of a vehicle.

As shown in FIG. 6, a cylindrical pressure introducing port 101, configured to be inserted into an opening provided in the intake manifold 200 as shown in FIG. 7B, extends from a main body 111 of the sensor 100. A gasket 99 is provided to seal the opening around the cylindrical pressure introducing port 101 when it is inserted into the manifold 200, thereby preventing gas from escaping from the pressure manifold 200 during engine operation. A pressure inlet 102 is located on a central axis of the pressure introducing port 101. A pressure sensor element 104 mounted on a cell case 103 is disposed on an upper end portion of the pressure introducing port 101, and is connected to a connector pin 107 via a lead terminal 106. The connector pin 107 in turn is connectable to a connector (not shown) that is inserted within a connector socket 108 that is formed integral with the main body 111. A pressure detection chamber 105 communicating with the pressure inlet 102 is formed below the pressure sensor element 104.

The pressure sensor element 104 is constructed by bridge-connecting a plurality of semiconductor strain gauges on a diaphragm composed of single-crystal silicon or the like. When the diaphragm is deformed by a change of gas pressure in the pressure detection chamber 105, the resistance of the semiconductor strain gauges is changed by a piezoelectric effect in accordance with the volume of the deformation. Based on this principle, the gas pressure of the pressure detection chamber 105, which is the gas pressure of the air/fuel mixture within the intake manifold 200, can be detected by detecting a voltage signal equivalent to the gauge resistance ratio.

Furthermore, a temperature sensor element 109 for measuring the temperature within the intake manifold 200 is disposed on a line extending along an axial direction of the pressure introducing port 101, and a lead wire 110 passes through the pressure inlet 102 and connects the temperature sensor element 109 to the connector pin 107. The temperature sensor element 109 is provided in order to detect the temperature within the intake manifold 200, as the pressure to be measured by the pressure sensor element 104 is related to temperature. The temperature sensor element 109 (for example, a thermister) includes a substantially cylindrical sensor body element 109a and a pair of lead terminals 109b that extend from both ends of the substantially cylindrical sensor body element 109a along an axial direction thereof.

The main body 111 is formed so as to surround an upper part of the pressure introducing port 101, and the connector socket 108 is configured to form a part of the exterior case 111 as described above. It should be noted that a mounting hole 112 is provided for fixing the integrated sensor 100 to the intake manifold 200 with a screw, bolt or some other mechanical attachment mechanism.

As stated above, FIG. 7 illustrates the integrated sensor 100 installed on or attached to the intake manifold 200 of a vehicle engine. The sensor body element 109a is disposed such that a central axis (c) of the sensor body element 109a is disposed perpendicular to an air flow direction of the intake manifold 200. As shown in FIGS. 7A and 7B, the position at which the integrated sensor 100 is attached to the intake manifold 200 is called "ideal attachment position" for the purposes of this discussion. In other words, in the integrated sensor 100 having the structure shown in FIG. 6 and FIG. 7, it is necessary to attach the integrated sensor 100 to the intake manifold 200 such that the connector socket 108 with the connector pin 107 becomes parallel to the central axis of the intake manifold 200 in order for the central axis of the main body element 109a to be perpendicular to the direction of air flow.

The above-described ideal mounting position, however, places limitations on vehicle designers as to where and how the integrated sensor 100 is to be positioned and oriented when installed in a vehicle. Accordingly, it would be desirable to provide an integrated sensor that was not limited to the above-described angular range

SUMMARY OF THE INVENTION

The present invention provides a sensor that can obtain a desired response speed of a temperature sensor element without relying on the inclination angle obtained when attaching the sensor to an object of attachment.

The sensor preferably includes a sensor body including a longitudinal axis defined by a length of the sensor and a latitudinal axis defined by a width of the sensor body, and a temperature sensor coupled to the sensor body, wherein the temperature sensor includes a sensor body element having a central axis corresponding to a length of the sensor body element; and wherein the central axis of the sensor body element of the temperature sensor is offset from the latitudinal axis of the sensor body. An integrated sensor is provided by further including a pressure sensor located within the sensor body.

In an illustrated embodiment, the sensor body includes a main body and a pressure introducing port that extends from the main body. The pressure introducing port includes a pressure inlet and the temperature sensor is disposed adjacent to the pressure inlet.

A connector socket is also preferably formed integral with the main body. At least one connector pin is located in the connector socket that is electrically coupled to the temperature sensor and is positioned coaxially with the longitudinal axis of the main body.

In a further preferred embodiment, the sensor includes a main body, a pressure sensor element located within the main body that measures pressure of a gas, and a temperature sensor element coupled to the main body that measures the temperature of the gas, wherein the temperature sensor element includes a columnar sensor body element and a pair of lead terminals that extend along an axial direction from both ends of the sensor body element. The main body of the sensor is attached to an object of attachment through which gas passes at a mounting position defined by an angle of $\theta_{rq}$ degrees with respect to an ideal attachment position of the main body of the sensor, wherein an inclination angle $\theta_{pos}$ at which a central axis of the sensor body element is inclined at the mounting position with respect to a position of the central axis of the element main body at the ideal attachment position of the sensor is set according to the following equation:

$$(\theta_{rq}-\theta_{allow}) \leq \theta_{pos} \leq (\theta_{rq}+\theta_{allow})$$

wherein $\theta_{allow}$ represents an allowable angle at which an allowable response speed of the temperature sensor element is obtained.

A connection fitting for connecting the pair of lead terminals of the temperature sensor element is connected to the pair of lead terminals and preferably configured such that the main axis of the temperature sensor element is position whereby $\theta_{pos}$ is acquired.

Alternatively, the pair of lead terminals are connected to a pair of connection fittings and preferably configured such that the main axis of the temperature sensor element is positioned, whereby the inclination angle $\theta_{pos}$ is acquired.

According to the present invention, even if the sensor is attached to the object of attachment at an angle of $\theta_{rq}$ degrees with respect to the ideal attachment position, a response speed within an allowable range of the temperature sensor element can be obtained by disposing the sensor body element of the temperature sensor element at an inclination angle of $\theta_{pos}$ degrees for satisfying the equation, $(\theta_{rq}-\theta_{allow}) \leq \theta_{pos} \leq (\theta_{rq}+\theta_{allow})$. The inclination angle $\theta_{pos}$ can be calculated extremely easily and the connection fittings and the lead wires for acquiring the inclination angle $\theta_{pos}$ can also be processed easily, thus the present invention can be realized at low cost.

Still further, another aspect of the invention is based on the recognition that a sensor structure can be disposed from an ideal mounting position while still maintaining desirable operating properties, According to this aspect of the invention, an apparatus is provided that includes an object of attachment through which a gas passes in a flow direction, and a temperature sensor element mounted to the object of attachment at a mounting position. The temperature sensor element includes a columnar sensor body element having a central axis corresponding to a length of the columnar sensor body element. The temperature sensor element is mounted to the object of attachment such that the central axis of the columnar sensor body element is offset from an axis perpendicular to the flow direction by an angle $\pm\theta$, wherein $0°<\theta\leq 45°$.

BRIEF DESCRIPTION OF THE DRAWINGS

The invention will be described with reference to certain preferred embodiments thereof and the accompanying drawings, wherein:

FIG. 7A is a plan view and FIG. 7B a right side view each showing a usage state of the integrated sensor shown in FIG. 6;

DESCRIPTION OF THE PREFERRED EMBODIMENTS

Figure 1:
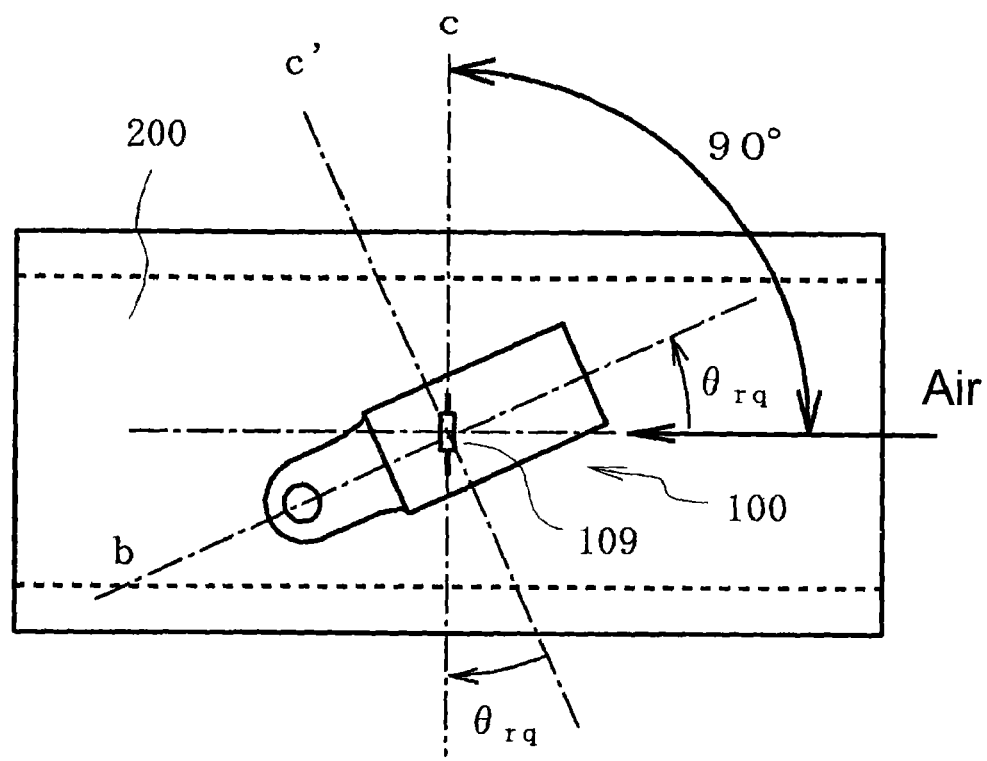
FIG. 1 is a diagram for explaining the principle of embodiments of the present invention.

As described above, the conventional practice in mounting an integrated sensor 100 is to located the sensor at an ideal mounting position such that the temperature sensor element 109 is perpendicular to the direction of air flow, and such a required positioning places limitations on vehicle designers with regard to the positioning of the integrated sensor 100 on an intake manifold. The present invention is based, in part, on the recognition that the directionality of the temperature sensor element 109 is limited to a certain level and, even if the sensor body element 109a is slightly inclined toward the direction in which the air passes through, an allowable response speed can be practically obtained.

For example, it has been experimentally determined that the central axis (c) of the sensor body element 109a may be positioned within a range of ±45° with respect to the position at which the central axis (c) is perpendicular to the direction in which the air within the intake manifold 200 passes through (the position of the central axis (c) shown in FIG. 7A). Accordingly, in contrast to conventional practice, the integrated sensor 100 may be attached at an angle to the intake manifold 200 within this allowable angular range. The discovery of this allowable range by the present inventor provides new mounting methods that can be employed by vehicle designers, namely, the sensor may be oriented the sensor at a mounting position on an intake manifold, wherein the central axis of the columnar sensor body element is offset from an axis perpendicular to the direction of air flow by an angle $\pm\theta$, wherein $0°<\theta\leq 45°$; and then attached to the intake manifold a fastening mechanism.

As described above, the inclination angle of the sensor body element 109a with respect to the direction in which the air passes through the manifold 200, i.e., the inclination angle of the integrated sensor 100 relative to the intake manifold 200, needs to be within a predetermined range in order to avoid delays in response time of the temperature sensor 109. While the discovery of this range provides significant benefits, it would be further preferable, to permit the integrated sensor 100 to be significantly inclined when it is attached to the intake manifold 200, thereby allowing an even greater flexibility in the layout of the components the engine.

Figure 6:
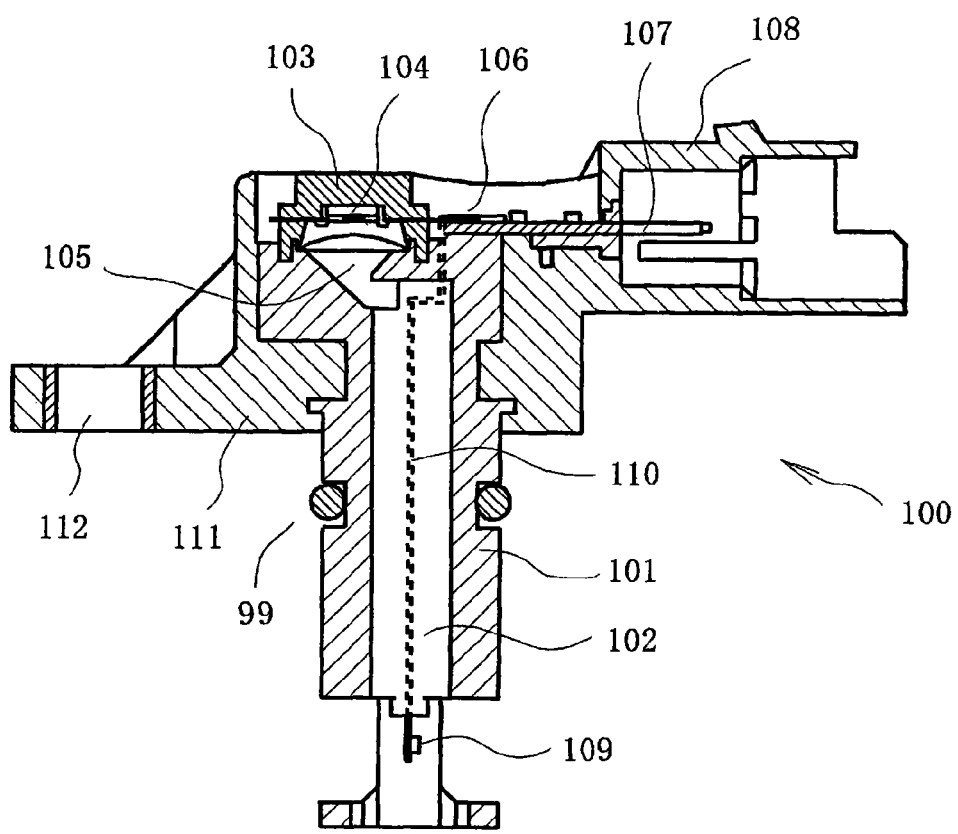
FIG. 6 is a vertical cross-sectional view of the central part of an integrated sensor.
Figure 8:
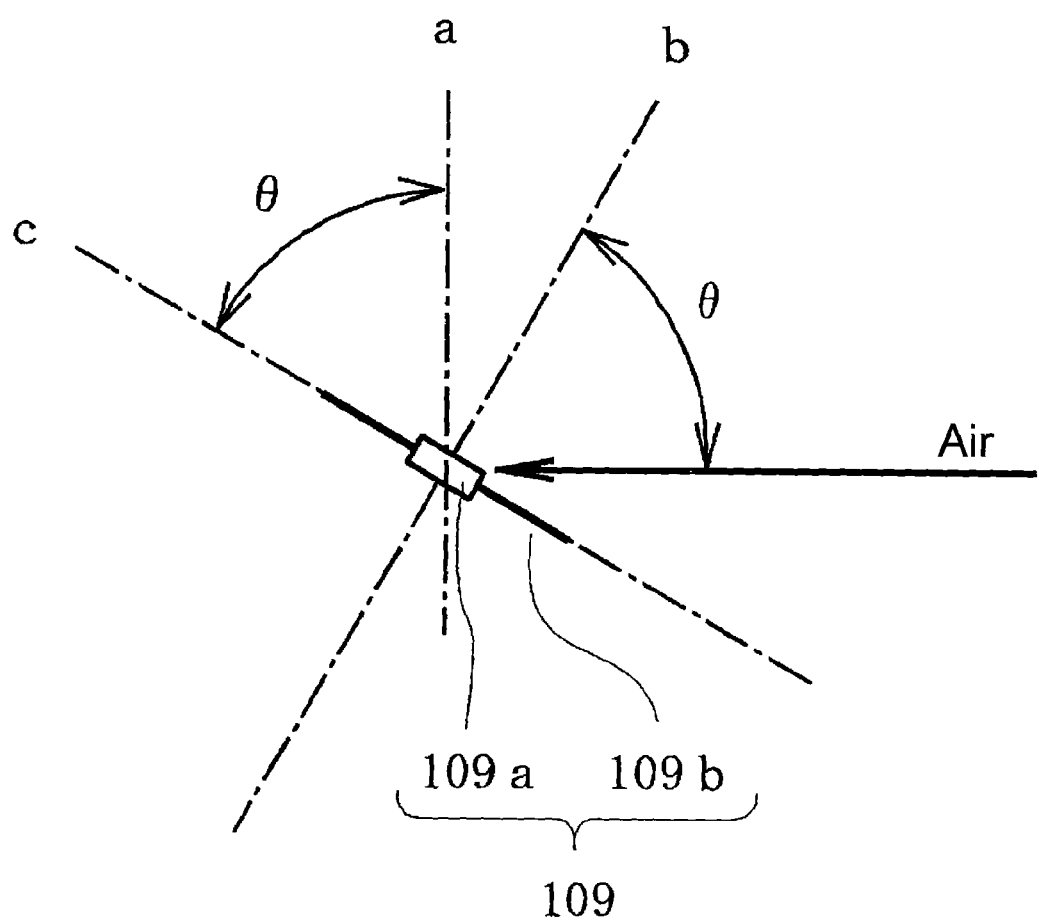
FIG. 8 is a diagram for explaining an inclination angle of a temperature sensor element.

For example, as shown in FIG. 8, suppose that the actual central axis (c) of the sensor body element 109a is inclined by an angle θ with respect to an axis (a), which is perpendicular to the direction in which the air passes through manifold (namely, the ideal central axis of the temperature sensor). An axis (b), also shown in FIG. 8, is an axis that is perpendicular to the central axis (c) and, in the integrated sensor 100 with the structure shown in FIG. 6 and FIG. 7, is an axis that corresponds to the longitudinal axis of the integrated sensor 100 and is parallel to the connector pin 107. When the inclination angle θ between the axis (a) and the axis (c) exceeds 45°, a delay occurs in a response of the temperature sensor element 109. For this reason, the temperature within the intake manifold 200 cannot be measured accurately and the demands of high engine control accuracy cannot be satisfied.

Figure 9:
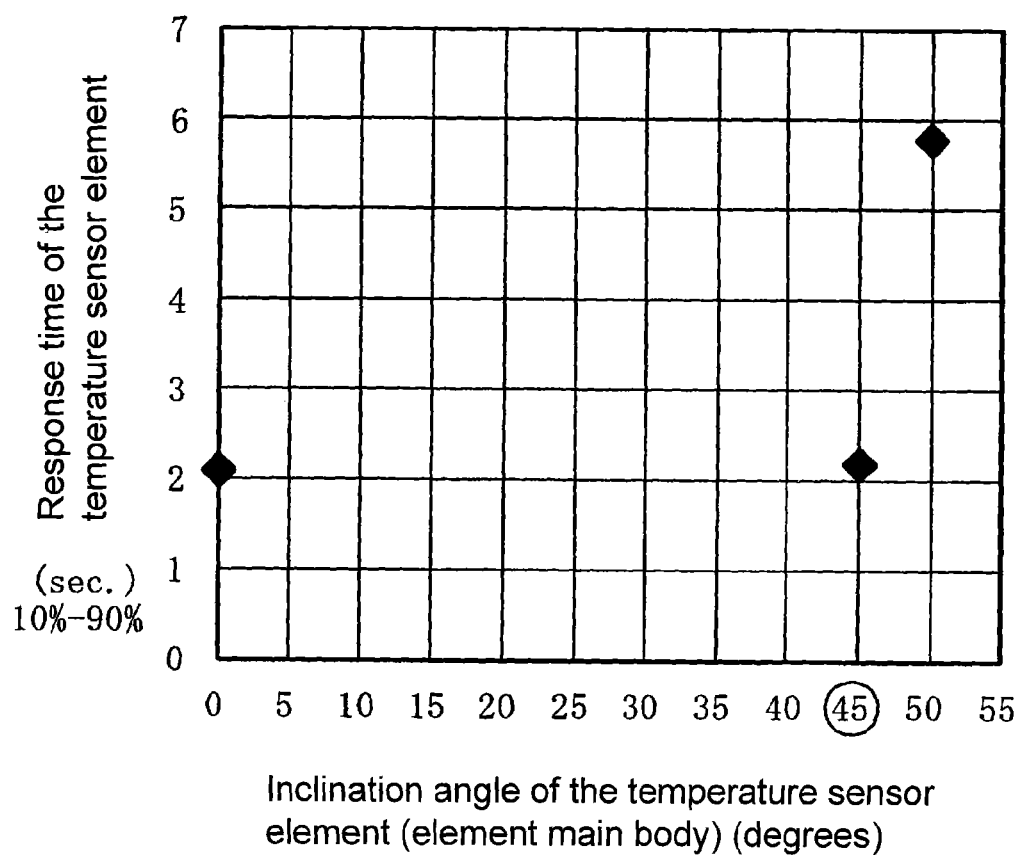
FIG. 9 is a diagram showing the relationship between the inclination angle and a response time of the temperature sensor element.

FIG. 9 is a diagram showing the relationship between the inclination angle of the sensor body element 109a and a response time of the temperature sensor element 109. It should be noted that the inclination angle of the sensor body element 109a is the angle θ mentioned above and shown in FIG. 8. Also, the response time of the temperature sensor element 109 is the time required when output voltage of the temperature sensor element 109 reaches 90% of $|V_1-V_2|$ from 10% when the temperature of the air to be measured changes from 25° C. (the temperature sensor output voltage at this moment is $V_1$) to 100° C. ($V_2$ at this moment). As is clear from FIG. 9, when the inclination angle of the sensor body element 109a is 45°, a response time that is substantially the same as the response time obtained when the inclination angle is 0° is obtained, but it has been experimentally confirmed that the response time becomes significantly slow when the inclination angle is 50° or greater.

As described above, the technology shown in FIG. 6 and FIG. 7 suffers from a limitation, namely, if the inclination angle of the integrated sensor 100 attached to the intake manifold 200 or the inclination angle of the element main body 109a of the temperature sensor element 109 varies from the predetermined range described above, the response time of the temperature sensor element 109 is prolonged and engine control accuracy deteriorates.

The operating principles of the present invention will now be described with reference to FIG. 1, which is a plan view illustrating the integrated sensor 100 attached to the intake manifold 200. In FIG. 1, in the case in which an angle between a longitudinal axis (b), which passes through the length of the integrated sensor 100, and the direction in which the air passes through the manifold 200 is $\theta_{rq}$ because of layout limitations, the sensor body element 109a is also disposed at the angle $\theta_{rq}$ with respect to a latitudinal axis (c'), which passes through the width of the integrated sensor 100. Accordingly, the central axis (c) of the element main body 109a at this mounting position is perpendicular to the direction in which the air passes through the manifold 200, even though the integrated sensor 100 is substantially inclined from the ideal mounting position described above. Thus the value of the response speed of the temperature sensor element 109 is maintained at an optimal level. In other words, optimal performance can be maintained by offsetting the central axis of the sensor body element 109a of the temperature sensor element 109 with respect to the latitudinal axis by the same angle at which the body of the integrated sensor 100 (specifically the longitudinal axis thereof) is offset from the mounting position illustrated in FIG. 7.

Further, if the sensor body element 109a is positioned within a range of ±45° with respect to the central axis (c) shown in FIG. 1, then as described above with respect to the conventional sensor, a good response speed can be practically obtained just as in the case of the conventional sensor. Therefore, the central axis of the sensor body element 109a may be actually disposed at an angle of $(\theta_{rq}-45°)$ through $(\theta_{rq}+45°)$ degrees with respect to the latitudinal axis (c') of the integrated sensor 100. For example, when the inclination angle $\theta_{rq}$ obtained when attaching the integrated sensor 100 is 50° (the inclination angle from the ideal attachment position), a good response speed can be practically obtained by disposing or offsetting the element main body 109a at an angle of 5° through 95° with respect to the latitudinal axis (c'). Accordingly, if the inclination angle of the sensor body element 109a with respect to the latitudinal axis (c') is $\theta_{pos}$, the sensor body element 109a may be inclined within a range of $(\theta_{rq}-45°)$ $\leq\theta_{pos}\leq(\theta_{rq}+45°)$. Therefore, by taking the allowable angle of the response speed, which is 45°, as $\theta_{allow}$, generally the sensor body element 109a may be inclined according to the following Equation 1.

$$(\theta_{rq}-\theta_{allow})\leq\theta_{pos}\leq(\theta_{rq}+\theta_{allow}) \qquad \text{Eq. (1)}$$

Viewed from another perspective, the central axis (c) sensor body element 109a must be counter-rotated or offset with respect to the latitudinal axis of the main body 111 in the same amount as the longitudinal axis of the main body 111 is rotated with respect to air flow. Thus, if the main body 111 is rotated by 50 degrees with respect to the direction of air flow, then the central axis (c) of the sensor body element 109a would have to be counter-rotated back by 50 degrees with respect to the latitudinal axis (c') of the main body 111 in order to return the central axis (c) to a position perpendicular to air flow. Using FIG. 8 to illustrate the above, with the longitudinal axis of the main body being axis (b), the central axis (c) shown overlying the latitudinal axis (c') at the indicated angle θ of rotation of the longitudinal axis from the direction of air flow, it is necessary to offset the central axis (c) by the same angle θ in order to counter-rotate the sensor body element 109a back to line (a) at which point the central axis (c) would be perpendicular to the direction of air flow.

Keeping in mind that the sensor body element 109a has an acceptable performance in a range of plus or minus 45 degrees without any offset, the central axis (c) of the sensor body element 109a could be set anywhere between 5 to 95 degrees offset for a 50 degree rotation of the main body 111. Accordingly, while the central axis (c) of the sensor body element 109a is coaxial with the latitudinal axis (c') of the main body 111 in the prior art, the central axis (c) of the sensor body element 109a is offset from the latitudinal axis (c') of the main body 111 in the present invention. The amount of offset corresponds to the amount of rotation of the longitudinal axis of the main body 111 from the direction of air flow.

Figure 2:
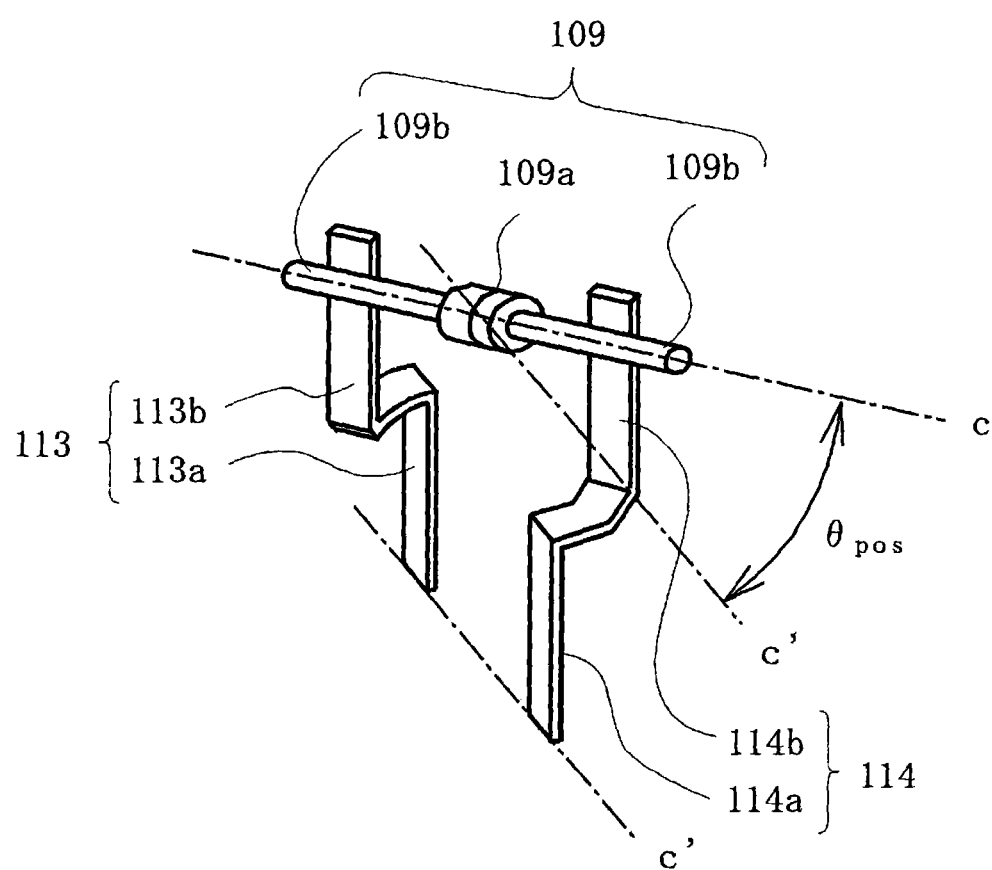
FIG. 2 is a perspective view showing a first embodiment of the present invention.
Figure 3:
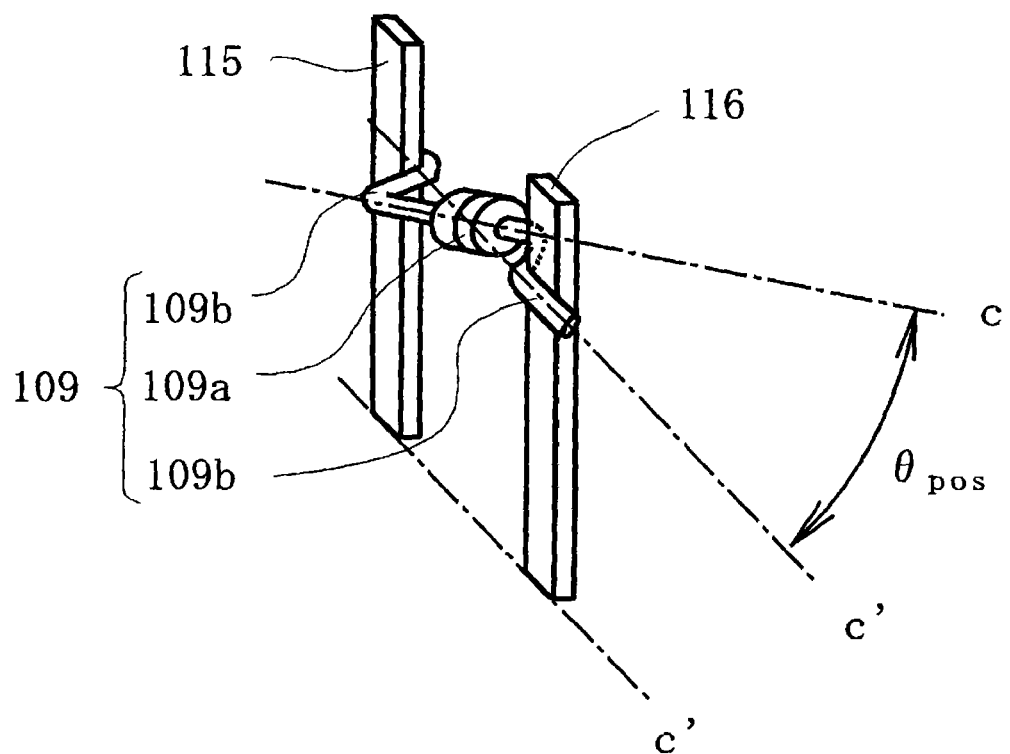
FIG. 3 is a perspective view showing a second embodiment of the present invention.

FIG. 2 and FIG. 3 will be used to explain embodiments of the invention in which the abovementioned inclination angle $\theta_{pos}$ is acquired by the sensor body element 109a of the temperature sensor element 109.

Referring now to FIG. 2, a perspective view of a first embodiment of the invention is illustrated. This embodiment relates to the structure of connection fittings 113 and 114 for connecting the temperature sensor element 109 to the lead wire shown in FIG. 6. Specifically, in the connection fittings 113 and 114, rear end portions 113a and 114a of the respective connection fittings are disposed along the latitudinal axis (c'), and a leading end portion 113b that is bent from the rear end portion 113a and a leading end portion 114b that is bent from the rear end portion 114a are subjected to a bending process so that the leading end portions are offset from the latitudinal axis and are configured such that the central axis of the temperature sensor element 109 acquires the angle $\theta_{pos}$ with respect to the latitudinal axis (c'). Then, lead terminals 109b, 109b of the temperature sensor element 109, which are disposed coaxially, are connected to the leading end portions 113b, 114b respectively by soldering, whereby the central axis (c) of the sensor body element 109a is inclined by $\theta_{pos}$ degrees with respect to the latitudinal axis (c'). It should be noted that either one of the leading end portions 113b and 114b of the respective connection fittings 113 and 114 may be subjected to a bending process as long as the angle $\theta_{pos}$ can be acquired. Moreover, the structures of the connection fittings 113 and 114 are not limited to those shown in the drawing.

By setting the inclination angle $\theta_{pos}$ within the range expressed by Equation 1 shown above, the sensor body element 109a is disposed at an angle of $\theta_{pos}$ degrees, which is within the allowable range, with respect to the latitudinal axis (c'), thus a desired response speed can be obtained. Here, the temperature sensor element 109 is disposed on a line extending along the axial direction of the pressure introducing port 101 shown in FIG. 6.

Next, FIG. 3 is a perspective view showing a second embodiment of the present invention. This embodiment is an example in which straight connection fittings 115 and 116 are disposed parallel to each other along the latitudinal axis (c'), while the lead terminals 109b of the temperature sensor element 109 are subjected to forming and then connected to the connection fittings 115 and 116 respectively, to thereby acquire the inclination angle $\theta_{pos}$.

Specifically, as shown in FIG. 3, the lead terminals 109b and 109b disposed coaxially with element main body 109a are originally subjected to a bending process to acquire the angle $\theta_{pos}$, and these bent lead terminals 109b and 109b are connected to the connection fittings 115 and 116, which are disposed along the latitudinal axis (c'), respectively by soldering or the like, whereby the central axis (c) of the sensor body element 109a is inclined by $\theta_{pos}$ degrees with respect to the central axis (c'). In this embodiment as well, the inclination angle $\theta_{pos}$ is set within the range expressed by Equation 1 shown above, whereby the sensor body element 109a is disposed at an angle of $\theta_{pos}$ degrees with respect to the original central axis (c'), thus a desired response speed can be obtained.

Figure 4:
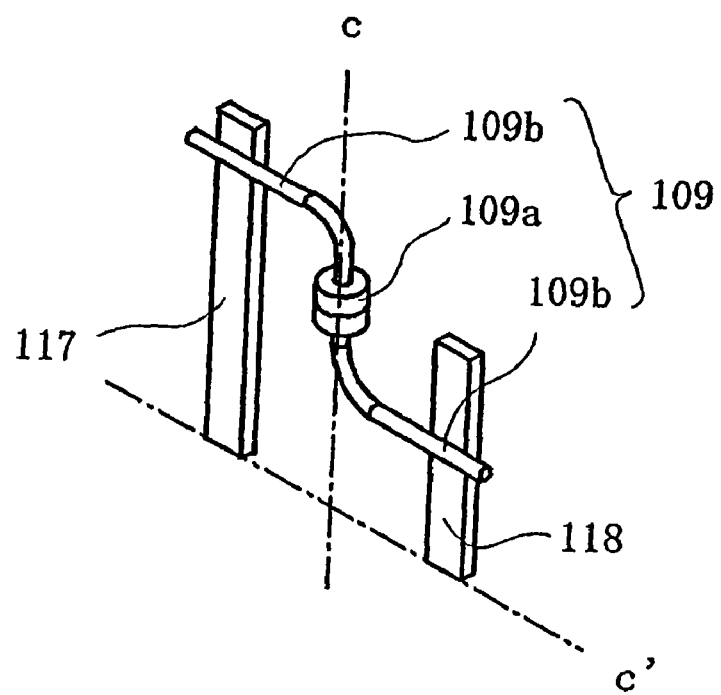
FIG. 4 is a perspective view showing a further embodiment of the present invention.

FIG. 4 is a perspective view showing a further embodiment of the present invention. In this embodiment, the temperature sensor 109 is disposed such that the central axis (c) of the element main body 109a is disposed parallel to the central axis of the pressure introducing port 101 shown in FIG. 6. It should be noted that reference numerals 117 and 118 represent the connection fittings to which the lead terminals 109b and 109b are connected respectively. Here, it is sufficient that the central axis (c) of the element main body 109a be parallel to the central axis of the pressure introducing port 101, and the central axis (c) of the element main body 109a may also be disposed coaxially with the central axis of the pressure introducing port 101.

Figure 5A:
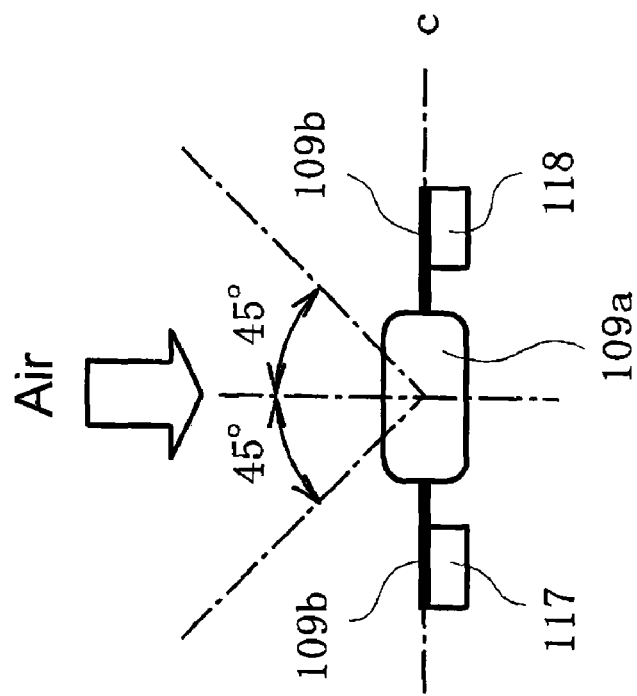
FIGS. 5A and 5B are side views showing an operation of the embodiment shown in FIG. 4 and an operation of the sensor shown in FIG. 6.
Figure 5B:
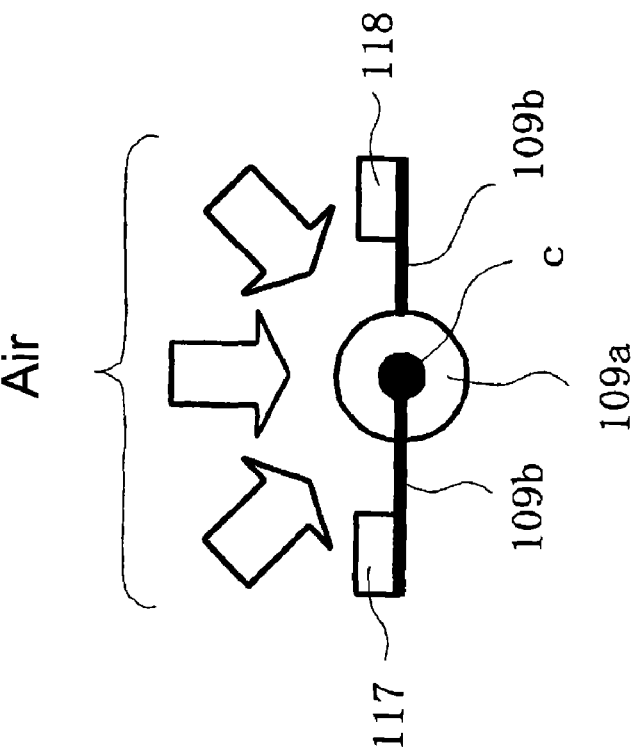

FIG. 5A is a diagram showing an operation of the embodiment shown in FIG. 4, and FIG. 5B is a diagram showing an operation of the technology shown in FIG. 6 and FIG. 7. In the technology shown in FIG. 5B, a desired response speed is obtained, only when the central axis (c) of the sensor body element 109a is positioned within a range of ±45° with respect to the position at which the central axis (c) is perpendicular to the direction in which the air passes through. Specifically, the allowable angular range obtained when the integrated sensor 100 is attached at an angle to the intake manifold 200 is narrow. According to the reference embodiment shown in FIG. 5A, however, the direction in which the air passes through is perpendicular to the central axis (c) of the sensor body element 109a at all times. For this reason, even in the case in which the integrated sensor 100 is attached to the intake manifold 200 at an angle of 180° or less, an optimal response speed can always be obtained.

The invention has been described with reference to certain preferred embodiments thereof. It will be understood, however, that modifications and variations are possible within the scope of the appended claims. For example, the invention is not limited to use on intake manifolds, but is applicable to the temperature measurement of any gas in any application.

Figure 10:
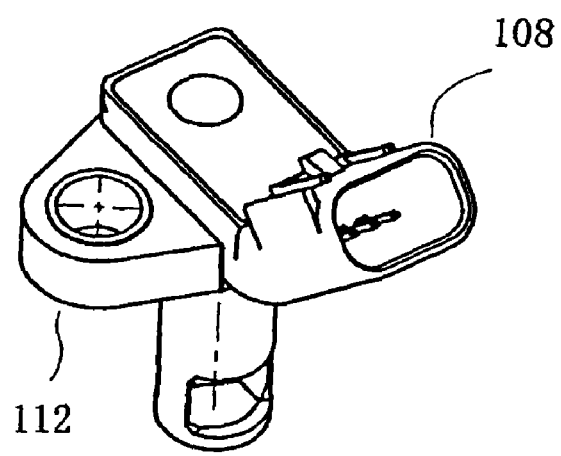
FIG. 10 is a perspective view of an alternative arrangement of the integrated sensor in accordance with the invention.

Moreover, the embodiments describe the pressure sensor integrated with a temperature sensor, but the principle of the present invention can be applied to a temperature sensor that does not have a pressure sensor element but has only a temperature sensor element. Further, the fastening mechanism can be any type of mechanism, including adhesive types instead of mechanical types that attach the sensor to the object of attachment. Still further, the illustrated embodiments employ a structure in which the connector pin is parallel to a longitudinal axis of the main body of the sensor, but other connector configurations may be readily employed. FIG. 10, for example, shows a further embodiment of the invention in which the connector socket 108 is angled upward and the mounting hole 112 is located on the side of the sensor. In this embodiment, the longitudinal axis is still defined along the length of the sensor which includes the connector socket 108. The above are just a few limited examples of possible modifications and variations within the scope of the appended claims.

What is claimed is:

1. A sensor comprising:
   a main body;
   a pressure sensor element that measures pressure of a gas located within the main body; and
   a temperature sensor element that measures temperature of the gas coupled to the main body, the temperature sensor element including a columnar sensor body element and a pair of lead terminals that extend along an axial direction from both ends of the sensor body element;
   wherein the main body of the sensor is attached to an object of attachment through which gas passes at a mounting position defined by an angle of $\theta_{rq}$ degrees with respect to an ideal attachment position of the main body of the sensor;
   wherein an inclination angle $\theta_{pos}$ at which a central axis of the sensor body element is inclined at the mounting position with respect to a position of the central axis of the main body at the ideal attachment position of the sensor is set according to the following equation:

$$(\theta_{rq}-\theta_{allow}) \leq \theta_{pos} \leq (\theta_{rq}+\theta_{allow})$$

wherein $\theta_{allow}$ represents an allowable angle at which an allowable response speed of the temperature sensor element is obtained.

2. The according to claim 1, further comprising a pair of connection fittings to which the pair of lead terminals are connected respectively, wherein the connection fittings are connected to the pair of lead terminals and configured to position the central axis of the sensor body element at the inclination angle $\theta_{pos}$.

3. The sensor according to claim 1, further comprising a pair of connection fittings to which the pair of lead terminals are connected respectively, wherein the pair of lead terminals are connected to the pair of connection fittings and configured to position the central axis of the sensor body element at the inclination angle $\theta_{pos}$.

4. The sensor according to claim 1, wherein the allowable angle $\theta_{allow}$ is 45°.

5. The sensor according to claim 1, further comprising an intake manifold, wherein the object of attachment to which the main body of the sensor is attached is the intake manifold.

\* \* \* \* \*